United States Patent [19]

Shimokura et al.

[11] 4,427,188
[45] Jan. 24, 1984

[54] EXTENSIBLE STRUT FOR USE IN DEVICE SUCH AS A GAS SPRING

[75] Inventors: Akihiro Shimokura, Higashi Minemachi; Tomio Imaizumi, Kawasaki, both of Japan

[73] Assignee: Tokico Ltd., Kawasaki, Japan

[21] Appl. No.: 383,198

[22] Filed: May 28, 1982

[30] Foreign Application Priority Data

Jun. 3, 1981 [JP] Japan .............................. 56-81654[U]

[51] Int. Cl.³ .............................. F16F 9/10; F16F 9/32
[52] U.S. Cl. .................................. 267/64.12; 188/300; 267/120
[58] Field of Search ...................... 188/300, 321.11, 67; 267/64.12, 120, 124

[56] References Cited

U.S. PATENT DOCUMENTS

| | | | |
|---|---|---|---|
| 3,938,793 | 2/1976 | Kaptanis et al. | 267/120 |
| 3,990,542 | 11/1976 | Dent et al. | 188/67 |
| 4,194,731 | 3/1980 | Marx | 267/120 X |

FOREIGN PATENT DOCUMENTS 4760107  6/1972  Japan .
1161859  12/1967  United Kingdom .

*Primary Examiner*—Douglas C. Butler
*Attorney, Agent, or Firm*—Wenderoth, Lind & Ponack

[57] ABSTRACT

An extensible strut such as a gas spring and having a cylinder, a rod guided by the cylinder and slidably extending through one end of the cylinder to the outside, and a locking mechanism for locking the rod at an extended position. The locking mechanism has inner and outer axially contiguous recesses formed in the outer circumference of the rod and having respectively oppositely inclining surfaces defining therebetween a ridge, a locking member selectively and rockingly movable between the inner and outer recesses and having axially spaced and radially projecting inner and outer legs, a resilient ring for snappingly locating the locking member in either of the inner and outer recesses, a retaining element secured to the cylinder for cooperating with the inner leg of the locking member when the same is in the outer recess thereby preventing the contraction of the rod, and a releasing element secured to the cylinder at the location axially outwards of the retaining element for cooperating with the outer leg of the locking member when the same is in the outer recess thereby snappingly move the same into the inner recess.

4 Claims, 13 Drawing Figures

EXTENSIBLE STRUT FOR USE IN DEVICE SUCH AS A GAS SPRING

BACKGROUND OF THE INVENTION

This invention relates to an extensible strut of the kind including a cylinder and a rod slidably guided by the cylinder and extending through one end thereof to the outside. A typical application of the strut is a gas spring.

It is usually required to provide a locking device in an extensible strut for locking the strut at least at one predetermined length position. However, the locking devices heretofore proposed have a complicated construction and are not reliable in operation.

SUMMARY OF THE INVENTION

One of the objects of the invention is to provide a novel strut having a locking device which is simple in the construction and is reliable in operation.

The extensible strut according to the invention comprises a cylinder, a rod slidably guided by the cylinder and extending to the outside through one end of the cylinder, first and second axially contiguous recesses provided in the outer circumference of the rod, the recesses having oppositely inclined surfaces defining therebetween a ridge or projecting portion, a locking member selectively and rockingly located in either of first and second recesses, the locking member having a generally V-shaped longitudinal cross-section and including first and second axially spaced and radially outwardly extending legs, resilient means for biasing the locking members radially inwardly whereby the locking member snappingly moves between the first and second recesses, a retaining element provided in the cylinder and projecting radially inwardly, and a releasing element provided in the cylinder and projecting radially inwardly by an amount larger than that of the retaining element, the retaining element and releasing element being spaced axially by an amount larger than that between the first and second legs of the locking member, the arrangement being such that when the locking member is located in the second recess and between the retaining and locking elements, the first leg is adapted to engage with the retaining element thereby preventing the movement of the piston rod and the second leg is adapted to engage with the releasing element whereby the locking member is moved to the first recess.

BRIEF DESCRIPTION OF THE DRAWINGS

Further objects and advantages of the invention will become apparent from the following description taken in conjunction with accompanying drawings illustrating some preferred embodiments of the invention in which.

DETAILED EXPLANATION OF THE PREFERRED EMBODIMENTS

Figure 1:
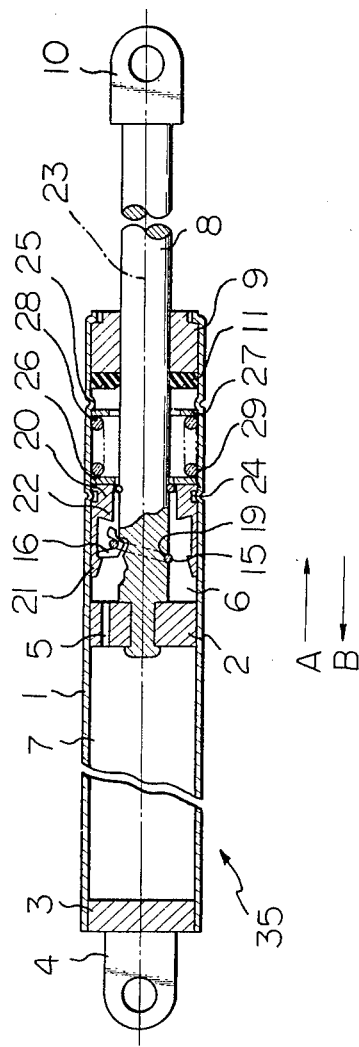
FIG. 1 is a longitudinal sectional view of an extensible strut according to the invention.

FIG. 1 shows a gas spring 35 constituting a preferred application of the extensible strut according to the invention, and the gas spring comprises a cylinder 1 with one end thereof closed by a cap 3, a piston 2 slidably mounted in the cylinder 1, a piston rod 8 connected to the piston 2 and extending to the outside through one end (the right end) of the cylinder 1 and through a seal 11 and a rod guide 9. A mounting member 4 is secured to the cap 3 and a mounting member 10 is secured to the tip end of the rod 8. A through hole or a passage 5 is formed in the piston 2 for communicating two chambers 6 and 7 which are defined in the interior of the cylinder 1 and are partitioned by the piston 2. The chambers 6 and 9 are filled with pressurized gas. The gas pressure normally urges the rod 8 in the extending direction, due to the difference in the pressure receiving areas on the piston 2 in the chambers 6 and 7, and thus, when no external force acts on the rod 8 the rod 8 takes the maximum extended position. There are provided in the inner end portion of the rod 8 a first recess 13 and a second recess 14 according to the invention, and the recesses 13 and 14 include oppositely inclined and generally symmetrical surfaces which define therebetween a ridge or projecting portion 30. A locking member 16 having a generally V-shaped or U-shaped configuration and having first and second radially outwardly extending legs 17 and 18 is located selectively in either of the two recesses 13 and 14. An annular resilient member 15 such as a ring shaped coil spring or a rubber ring is fitted on the locking member 16 to snappingly locate the locking member 16 in either of the recesses 13 and 14. In the embodiment of FIG. 1, the recesses 13 and 14 and the locking member 16 are provided at one predetermined angular position with reference to the circumference of the rod, but it will be understood that they extend respectively in the circumferential direction through a desired range such as about 90 degrees. A recess 19 is formed at a longitudinal position nearly corresponding to that of the ridge 30 and at an angular position diametrically opposite to the recesses 13 and 14 for locating the resilient member 15.

An annular engaging member 20 having the outer diameter corresponding to the inner diameter of the cylinder 1 is fitted in the cylinder 1 and is secured thereto by an annular projection 24 formed on the inner circumference of the cylinder 1. According to the invention, there are provided on the inner circumference of the engaging member 20 a retaining element 21 and a releasing element 22. The retaining element 21 and the releasing element 22 are spaced an axial distance larger than that of the legs 17 and 18 of the locking member 16, and the releasing element 22 extends radially inwardly a distance larger than that of the retaining element 21. Further, the retaining element 21 has a generally radially extending wall portion and an inclined wall portion gradually inclining axially and radially outwardly.

There are also provided in the cylinder 1 spring retainers 26 and 27 and a coil spring 28 axially outwards of the engaging member 20. An annular stop 29 is mounted on the rod 8 and cooperates with the spring retainer 26 to resiliently restrict the outward (rightward as viewed in FIG. 1) movement of the rod 8. Normally, the rod 8 takes the most extended position whereat the gas pressure acting on the piston 2 is received by the coil spring 28 with the annular stop 29 engaging with the spring retainer 26, and the locking member 16 is located in the second recess 14 and between the retaining element 21 and the releasing element 22 of the engaging member 20.

Figure 2:
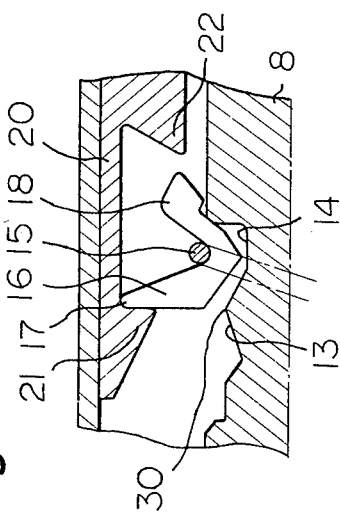
Figure 8:
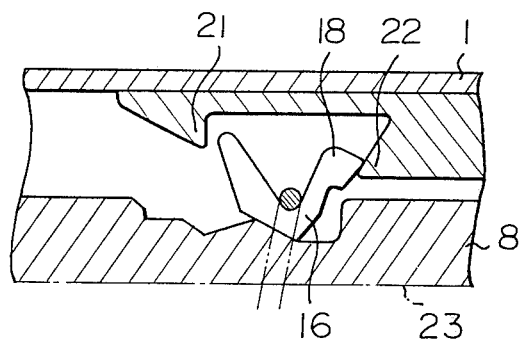

In use, the gas spring 35 is mounted on e.g. an automobile with the mounting member 4 on the cap 3 being connected to a vehicle body and the mounting member 10 on the rod 8 being connected to such as a hatch back door. In opening the door, the gas spring 35 extends and aids the opening movement of the door. When the door is fully opened, the gas spring takes a normal fully extended position as shown in FIGS. 1 and 8 whereat the locking member 16 is located in the second recess 14 and between the elements 21 and 22 of the engaging member 20. The weight of the door may tend to contract the gas spring, at that time, but the first leg 17 engages with the retaining element 21 as shown in FIG. 2 thereby preventing further contraction of the rod 8. The gas spring is effectively and reliably locked. It will be understood that FIG. 2 shows the condition whereat a relatively large compressive force acts on the gas spring whereby the locking member 16 is displaced radially outwardly against the force of the resilient ring 15.

Figure 3:
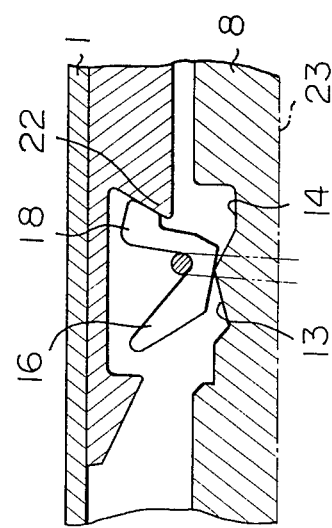
FIGS. 2-8 are enlarged partial views of the strut of FIG. 1 and showing various operational modes.
Figure 4:
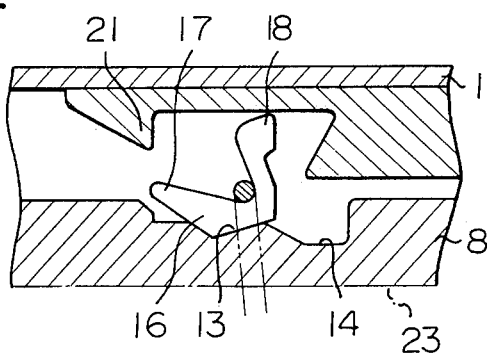
Figure 5:
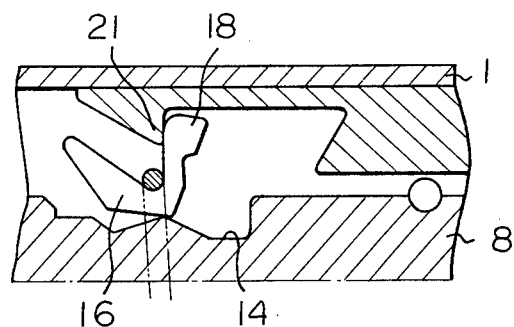
Figure 6:
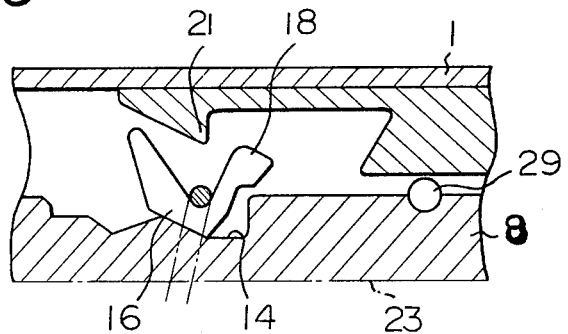
Figure 7:
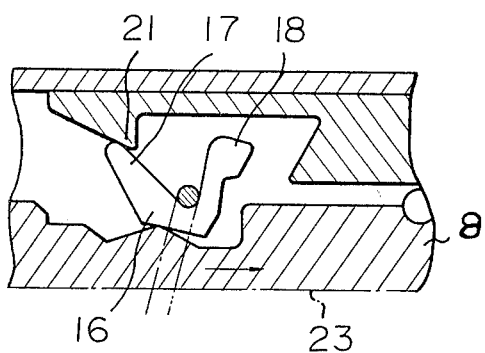

For releasing from the locked condition, firstly, the rod 8 is moved in the extending direction or the arrow A direction by displacing the retainer 26 against the force of the spring 28. The releasing element 22 engages with the second leg 18 of the locking member 16 as shown in FIG. 3 until the locking member 16 rockingly and snappingly moves from the second recess 14 to the first recess 13 as shown in FIG. 4. Thereafter, the rod 8 is moved in arrow B direction or the contracting direction. The second leg 18 engages with the retaining element 21 and, in response to the movement of the rod 8, the locking member 16 rockingly and snappingly moves from the first recess 13 to the second recess 14 as shown in FIGS. 5 and 6. It will be understood that there is a radial gap between the second leg 18 and the retaining element 21 when the locking member 16 is located in the second recess 14 as will be understood from FIG. 6. The rod 8 can be moved in arrow B direction by the full stroke. When the rod moves in arrow A direction, the inclined wall portion of the retaining element 21 engages with the first leg 17 of the locking member 16 to rockingly move the locking member 16 in the counterclockwise direction as shown in FIG. 7, but the locking member 16 does not displace from the second recess 14 to the first recess 13 and, finally, the locking member 16 is located between the retaining element 21 and the releasing element 22 as shown in FIG. 8. The gas spring is then in the locked condition.

The locking device according to the invention is particularly advantageous for use in a gas spring when the ambient temperature decreases thereby decreasing the pressure of the gas enclosed in the gas spring so that the gas spring cannot maintain the maximum extended condition by means for the enclosed gas.

Figure 9:
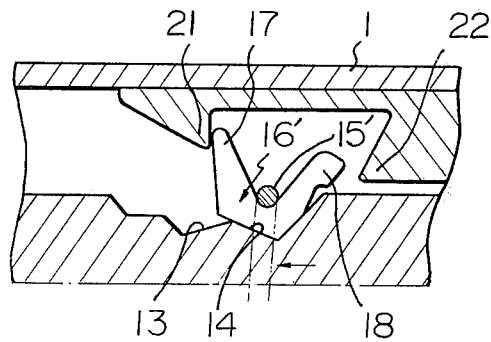
FIG. 9-13 are views similar respectively to FIGS. 2, 3, 5, 6 and 7 but showing a modified form.
Figure 10:
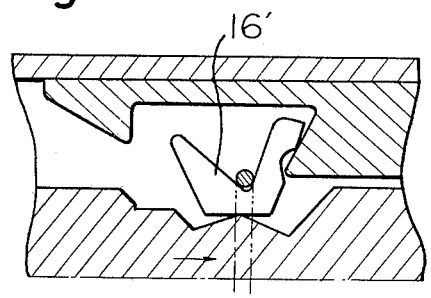
Figure 11:
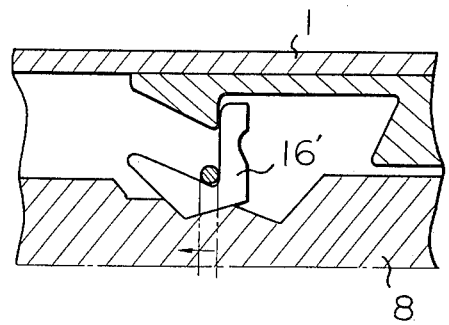
Figure 12:
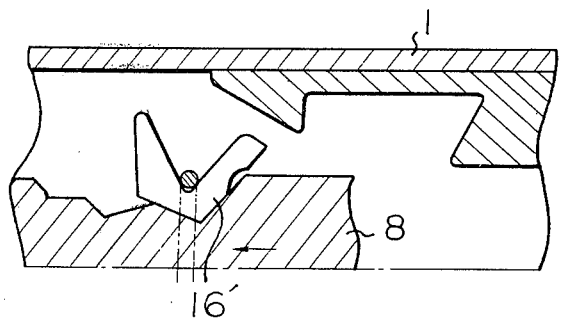
Figure 13:
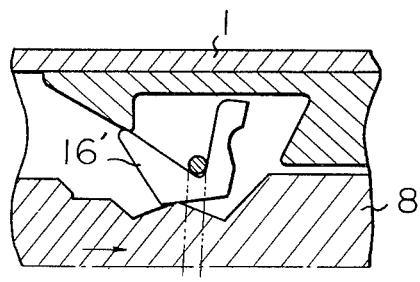

FIGS. 9-10 show a modified form wherein the first and second recesses are annular, and a plurality of circumferentially spaced locking members 16' are selectively and snappingly mounted in either of the recesses 13 and 14. An annular resilient member 15' acts on the locking members 16. The function and operation of the embodiment is similar to the first embodiment.

It will be understood that the invention is not limited to gas springs and may be applied to extensible struts of other types.

According to the invention, the rod can reliably be retained with respect to the cylinder with a very simple construction, and can easily be released from the locked condition.

It will be understood that the rod 8 of the gas spring 35 is urged in arrow A direction by the gas pressure and that the locking mechanism according to the invention acts to prevent the contraction of the rod from a predetermined extended condition and is released from the locked condition by movement to a further extended condition. Thus, it is necessary to provide the spring retainer 26, spring 28 and the ring 29 for preventing the rod 8 from adversely extending to the further extended condition. However, when the cylinder 1 and the rod 8 constitute a simple extensible strut, the spring retainers 26 and 27, the spring 28 and the ring 29 may be omitted. In such case, it is preferable to make the axial length between the retaining element 21 and the releasing element 22 sufficiently larger than the axial length of the locking member 16 and to provide a suitable marking on such as the rod for clearly distinguishing aforesaid predetermined extended condition at which the locking mechanism functions from the aforesaid further extended condition at which the locking mechanism is released.

What is claimed is:

1. An extensible strut comprising a cylinder, a rod guided by the cylinder and slidably extending to the outside through one end of the cylinder, said rod having first and second axially contiguous recesses provided in the outer circumference thereof, said recesses having oppositely inclined surfaces defining therebetween a projecting portion, a locking member selectively and rockingly located in either of said first and second recesses, said locking member having a generally V-shaped longitudinal cross-section and including first and second axially spaced and radially outwardly extending leg portions, resilient means for biasing said locking member radially inwardly whereby said locking member snappingly moves between said first and second recesses, a retaining element provided in the cylinder and projecting radially inwardly, and a releasing element provided in the cylinder and projecting radially inwardly by an amount larger than that of the retaining element, said retaining element and releasing element being spaced axially by an amount larger than that between the first and second leg portions of the locking member, the arrangement being such that when the locking member is located in the second recess and between the retaining and locking elements, the first leg portion is adapted to engage with the retaining element thereby preventing the movement of the rod in one direction and the second leg portion is adapted to engage with the releasing element in response to the movement of the rod in the other direction whereby the locking member is moved to the first recess.

2. An extensible strut according to claim 1 wherein said cylinder contains therein pressurized gas, and said rod is a piston rod connected to a piston working in the cylinder.

3. An extensible strut according to claim 2 wherein said locking member and the retaining element cooperate to maintain the piston rod at an extended position, and the strut further comprises resilient means for defining a normally maximum extended position of the piston rod.

4. An extensible strut according to claim 1 wherein said first and second recesses are provided at the inner end portion of the rod, and an annular member secured to the inner circumference of the cylinder at a position near said one end of the cylinder on which said retaining and releasing elements are provided.

* * * * *